United States Patent [19]

Mantell

[11] 4,154,677

[45] May 15, 1979

[54] AUTOMATIC CONTROL OF A FILTER BED WASH PROCESS

[76] Inventor: Myron Mantell, 19 Cooper Dr., Boonton, N.J. 07005

[21] Appl. No.: 803,875

[22] Filed: Jun. 6, 1977

[51] Int. Cl.[2] .................................................. B01D 23/24

[52] U.S. Cl. .................................. 210/81; 210/96 R; 210/138; 210/409

[58] Field of Search ................................... 210/80-82, 210/96 R, 138, 409

[56] References Cited

U.S. PATENT DOCUMENTS

| | | | |
|---|---|---|---|
| 3,078,224 | 2/1963 | Schulze et al. | 210/82 X |
| 3,862,036 | 1/1975 | Simmons | 210/82 |
| 3,899,421 | 8/1975 | Keilin et al. | 210/96 R |
| 4,045,342 | 8/1977 | Küster et al. | 210/81 |

*Primary Examiner*—William A. Cuchlinski, Jr.
*Attorney, Agent, or Firm*—Sheldon H. Parker

[57] ABSTRACT

An influent stream is passed through a filter bed separating contained particulate material from the mother liquor; the process being carried out until such time as the filter bed can no longer practically sustain further separation operation. A wash step is then commenced in which a wash liquor is passed through the filter bed, washing soluble components sorbed or deposited on the filter bed or in the filter cake. The concentration of soluble salts in the wash liquor is sensed and when the concentration reaches a predetermined minimum level, the wash liquid flow is stopped for a predetermined period of time. The flow is then resumed for a predetermined minimum time period and if the concentration of soluble salts in the wash liquid is, at the end of said minimum time period, not above a predetermined minimum level, the wash step is terminated. Otherwise, the wash step is intermittantly repeated until such time as the aforenoted termination occurs.

8 Claims, 2 Drawing Figures

AUTOMATIC CONTROL OF A FILTER BED WASH PROCESS

BACKGROUND OF THE INVENTION

1. Field of the Invention

This invention relates to liquid filtering and more particularly, to the period washing of the filter cake.

2. Description of the Prior Art

Filtering techniques are well established in the art and for the separation of particulate material from a mother liquor. In some applications a waste product must be removed and disposed of and in others the main product of a process is deposited on the filter. In some instances the mother liquor or soluble particles contained in the filter cake are valuable products which require recovery.

The wash can serve to wash soluble components from the filter cake. The instant invention is not concerned with, or limited to any particular filtering technique or type of filter bed, and has equal applicability to gravity filters, pressure filters or vacuum filters, and equally applies to backwash, throughwash or combination wash techniques. The thrust of the invention is at the maximizing of the efficiency of the wash operation irrespective of the type of filtration operation or filter bed with which the wash is used to remove mother liquor or soluble components sorbed or deposited on the filter or in the filter cake.

Due to the current recognition of the need to prevent polution of our atmosphere and water supplies, rivers and the like, the dumping of waste produce into bodies of water is frequently prohibited or restricted unless the waste product is of such a nature as to not adversely affect the environment. For this reason, in many applications, it is necessary to reduce the quantities of waste being dumped. In other applications, the desire to separate soluble components from the wash liquor is due to the value of the soluble component. High energy and materials costs dictate that the recovery process involve the use of a minimum amount of energy and therefore it is preferable to maximize the ratio of soluble component to wash liquor. The washing techniques typically involve passing as much wash fluid through the filter bed as necessary to separate the soluble constituents from the filter cake. If all of the soluble salt contaminants or products which must be washed from the filter cake were contained in the mother liquor, removal would require one void volume of wash liquor. Heretofore, very little consideration has been paid to the minimizing of the quantity of wash fluid which is used because of the uncertainties of establishing a minimum.

SUMMARY OF THE INVENTION

It has now been found that the quantity of fluid used for the wash process can be dramatically reduced by the use of an intermittant wash step. In accordance with the present invention, an influent stream is passed through a filter bed separating contained particulate material from the mother liquor; the process being carried out until such time as the filter bed can no longer practically sustain further separation operation. A wash step is then commenced in which a wash liquor is passed through a filter bed, washing mother liquor and/or soluble components sorbed or deposited on the filter bed or filter cake. The concentration of soluble salts in the wash liquor is sensed and when the concentration reaches a predetermined minimum level, the wash liquid flow is stopped for a predetermined period of time. The flow is then resumed for a predetermined minimum time period and if the concentration of soluble salts in the wash liquid is, at the end of said minimum time period, not above a predetermined minimum level, the wash step is terminated. Otherwise, the wash step is intermittantly repeated until such time as the aforenoted termination occurs.

BRIEF DESCRIPTION OF THE DRAWINGS

The objects and advantages of the invention will become apparent from the following detailed description of the invention, particularly when read in conjunction with the drawings, wherein.

DESCRIPTION OF THE PREFERRED EMBODIMENT

Figure 1:
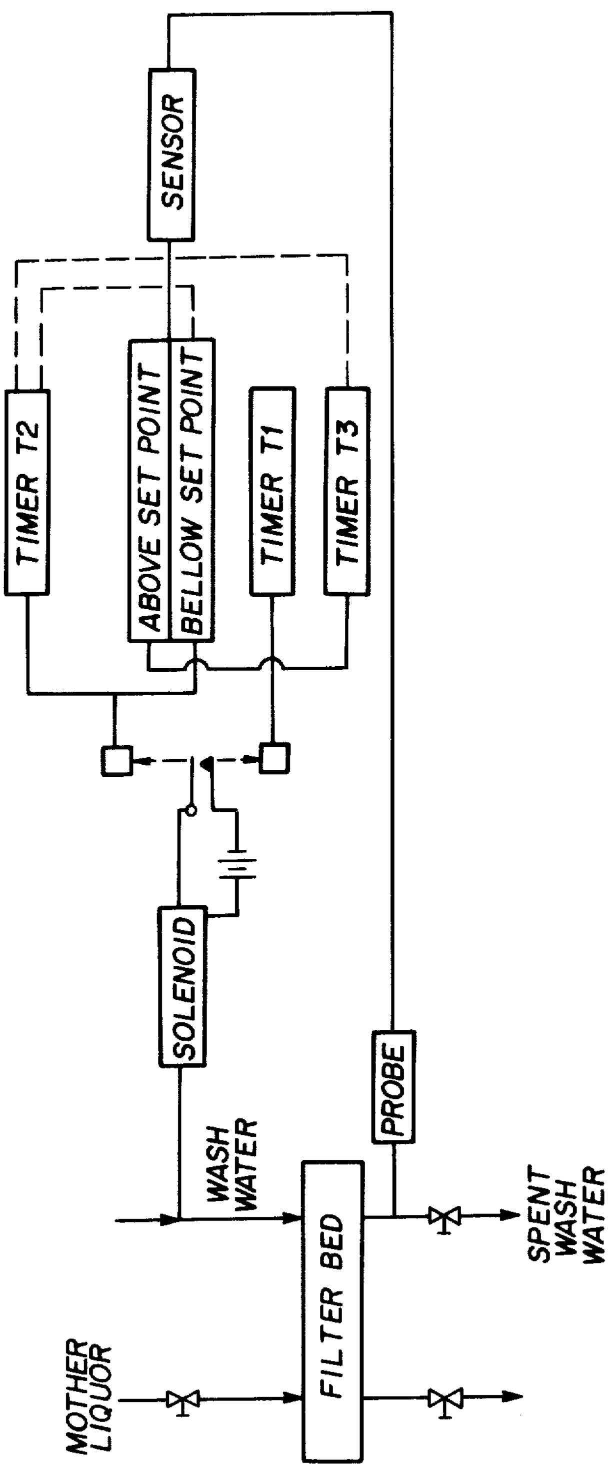
FIG. 1 is a schematic illustration of the process of the present invention.

The use of through or backwash techniques either for removing entrained solids from a filter bed or washing soluble components from a filter cake is well known in the art. Essentially, the process involves sending a stream, typically of water, through the filter bed or filter cake. The wash process removes mother liquor entrapped within the filter bed or filter cake and permits recovery of this product should it be valuable. In the case of a process in which soluble components absorbed, adsorbed or otherwise contained in the filter cake are washed from the filter cake, it is found that the actual time and quantity of water necessary to remove the soluble components far exceeds the theoretical minimums which would appear to be required.

One of the important factors which is currently encountered in filtration operations is the problem of disposing of waste products from the process and the separation of valuable soluble components from the wash water. Where dumping of waste products is an unsound procedure because of polution prevention requirements, it frequently becomes necessary to minimize the quantity of wash water in order to facilitate the disposal of the waste products or the wash water.

It is further noted that because of the high cost of energy and materials, it is desirable to use the minimum amount of wash fluid consistant with maximum removal of solubles in order to minimize the energy costs associated with separating valuable solubles from the wash fluid.

It has now been found that one of the limiting factors which takes place in the washing of soluble components from a filter cake during a throughwash operation is the mass transfer limitations of the system and that proper recognition and use of this controlling factor can result in more efficient and economical processes through the conservation of power and throughwash fluid.

The wash system of the present invention departs from those of the prior art by being an intermittent operation, having specifically determined and controlled interruptions. When the concentration of salts in the wash water becomes very low, the system automatically initiates a series of wash sequences in order to produce a spent wash water having a reasonable consistently high salt concentration.

The system inherently also makes a highly reliable measurement of the salts remaining in the cake by measuring the conductivity of the water extract after a period in which the wash step is interrupted or after it is terminated. It should be noted that while reference is made to wash water, any desired fluid can be used, with water being the most commonly employed liquid.

It has now been found that a dramatic reduction in the amount of wash fluid required to achieve maximum separation from solubles contained in a filter cake can be achieved by continually monitoring the concentration of solubles contained in the wash and when the concentration reaches a predetermined minimum level, interrupting the wash step for a predetermined time period. At the end of this first predetermined time period, provided the soluble concentration has returned to a level which exceeds a predetermined second minimum level after a second predetermined time period, the wash step is resumed until such time as the concentration of solubles in the wash once again drops below the predetermined first minimum level. Once again for the first predetermined period of time the wash step is interrupted and then resumed again at the end of this period of time providing once again there is a concentration level which exceeds the aforenoted second predetermined minimum concentration level. The series of wash interruptions and resumptions is continued until such time as the concentration fails to return to said second predetermined minimum level after the requisite interruption time period.

At the onset of the wash operation a start switch is activated which preferably has a prolonged "on" period so that flow through the system for at least one minute is provided. Preferably, the start switch activates a timer T1 which maintains the valve Vb in a mandatory "on" condition. The required one minute of flow enables the probe of the conductivity cell to be washed with high conductivity wash fluid for a period sufficient for a start up equilibrium to be established. As evident from the graph of FIG. 2, the conductivity starts high and eventually drops to below the "set point" of the conductivity cell. The conductivity cell has a relay which is then activated causing the wash flow control valve Vb to be activated closing the valve and also causing the timer T2 to start. The timer T2 is preferably a variable timer set for ten minutes, or other period as required by the system. In the event the interruption cycle is excessively frequent, the timer should be set for a longer mandatory "off" period. At the end of the mandatory "off" period, the timer T2 activates solenoid control wash water flow control valve Vb causing the valve Vb to open and produce a restart of the flow of the wash fluid. At the conclusion of the interval of timer T2, the timer T3 is caused to initiate a mandatory "on" period. A variable timer is preferred and a minimal time period of about one minute is usually sufficient to establish flow conditions for a sufficient time period to wash the probe and establish a proper equilibrium. In the absence of the mandatory "on" period, it is possible for the probe which has been sitting for perhaps ten minutes in a stagnant fluid, to see uncharacteristically high or low concentration fluid.

At the end of the mandatory "on" period, the system goes to a "terminate" wash condition unless the conductivity level of the wash fluid is above the set point of the conductivity cell, in which case the system repeats the cycling steps. Specifically, the wash continues until the conductivity drops below the set point activating the closing of the wash flow control valve and starting of timer T2 which maintains the wash off for ten minutes.

Because of the variables to be determined for each product being washed, or solvents to be extracted by water, or salts to be removed, a variable set point is provided so that the concentration level at which wash interruption is initiated or wash is terminated can be suited to fit the requirements of each process. For the same reason, a variable delay is provided for the wash water timers. It is noted that reference is made to a first and second predetermined minimum concentration level the levels are typically the same.

In a typical operation a mother liquor containing materials such as lead chromate, sodium chromate and sodium nitrate is filtered until a wash step is determined as being required as is well known in the prior art. The sodium chromate is extracted from the filter cake with water and its concentration in the wash water is preferably continually monitored, as for example by means of a conductivity cell such as the type sold under the trademark Solumeter by the Beckman Instrumation Company. It should be noted that concentration can be measured in any convenient manner, as for example by means of a colorimeter, conductivity meter, pH meter, ion detector, or the like. Reference to conductivity is employed herein for convenience only and not by way of limitation.

Figure 2:
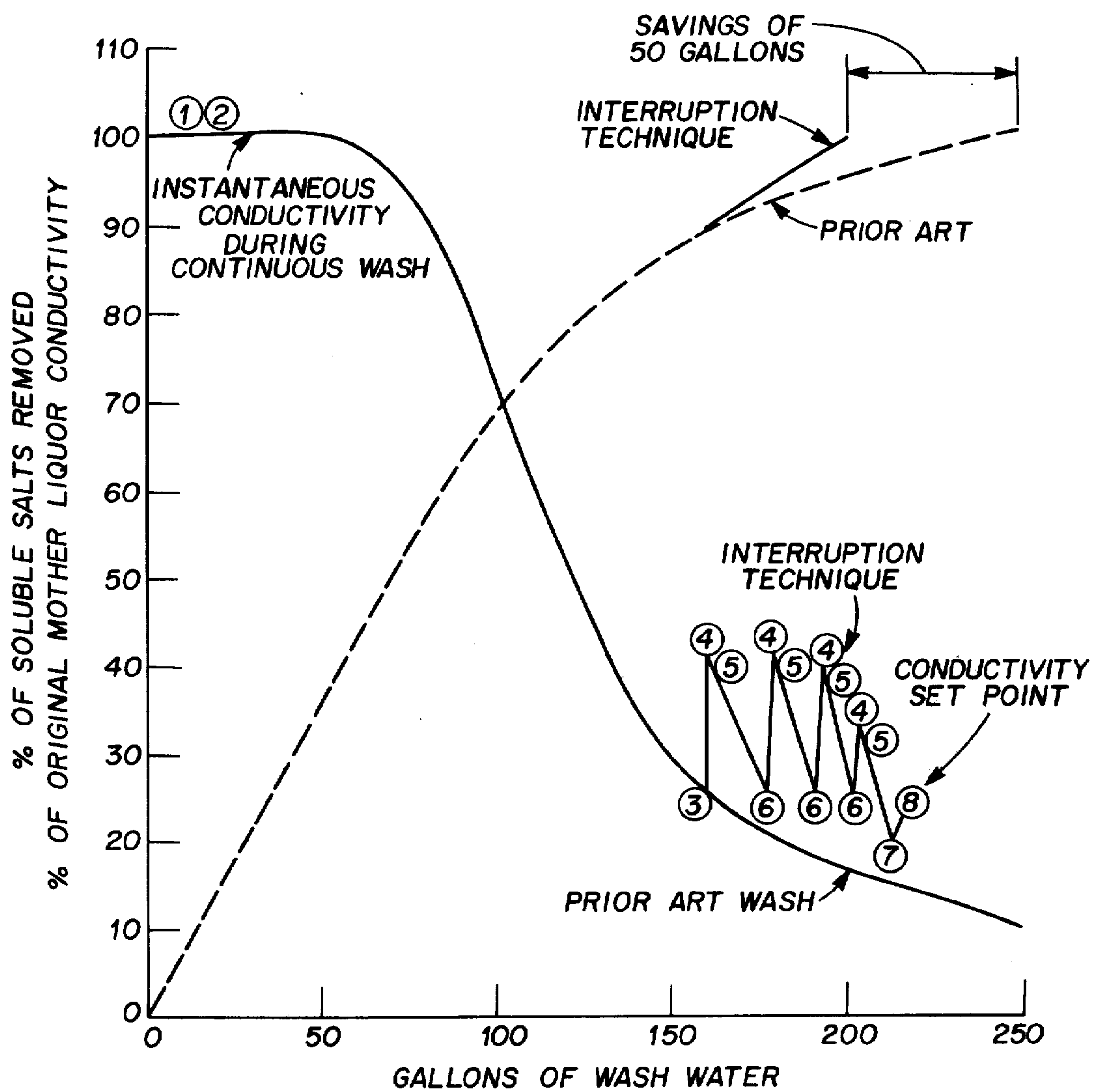
FIG. 2 is a graph in which the "% of Original Mother Liquor Conductivity" is plotted vs. "Gallons of Wash Water" and "% of Soluble Salts Removed" is plotted against "Gallons of Wash Water".

The concentration of the soluble components in the wash is plotted in FIG. 2 as a ratio of the conductivity of the soluble components in the mother liquor to the conductivity of the soluble component in the wash liquid during each stage of the wash step. When the ratio falls to a predetermined level, for example about 25% of its initial conductivity, the relay in the conductivity cell responds to the conductivity signal and activates a valve which interrupts a flow of wash fluid and starts the operation of a timing clock. After a predetermined period of time which can, for example, be ten minutes, the valve is opened and the wash step is resumed and maintained until such time as the conductivity falls to the predetermined minimum percentage of its initial value.

The ten minute mandatory off timer activates a one minute mandatory on timer. If at the end of the one minute mandatory on period the conductivity has not risen above the predetermined set point, the wash cycle is terminated. The indicator of completion of the wash can be rendered visually and/or audibly if desired and the next step can be manually or automatically initiated.

The following correlates the various steps with the conductivity level (above or below the conductivity cell set point), the open or closed condition of the filtration mother liquor flow control valve Vf, the open or closed condition of the fluid flow control valve Vb and the on or off condition of the three timers T1, T2, and T3.

| | SENSOR | | VALVES | | TIMERS | | |
|---|---|---|---|---|---|---|---|
| | Set Point | Set point | Valve (Vf) | Valve (Vb) | T1 | T2 | T3 |
| 1. Start | — | — | C | 0 | X | | |
| 2. Wash | X | | C | 0 | | | |
| 3. Interrupt | | X | C | C | | X | |
| 4. Restart | — | — | C | O | | | X |
| 5. Wash | X | | C | 0 | | | |
| 6. Interrupt | | X | C | C | | X | |
| 7. Restart | — | — | C | 0 | | | X |

-continued

| | SENSOR | | VALVES | | TIMERS | | |
|---|---|---|---|---|---|---|---|
| | Set Point | Set point | Valve (Vf) | Valve (Vb) | T1 | T2 | T3 |
| 8. Terminate | | X | C | C | | | |

— = set point can be at either setting
T1 and T3 are mandatory "on" controls
T2 is a mandatory "off" control It should now be evident that rather than terminating wash water flow when the wash water conductivity is at or near zero, the present invention interrupts wash water flow at a much higher solute concentration level and repeatedly repeats and interrupts the wash cycle until optimum recovery is achieved.

The prior art approach requires the use of a great excess quantity of wash water to achieve essentially complete soluble constituent or mother liquor removal from the filter cake. By way of contrast, the present invention conserves water and the energy necessary to separate the soluble salts from the wash water by suspending the filter cake in the wash water during the interruption period. During this period, soluble salts in the filter cake are given sufficient time to migrate to the surface of the filter cake and into the wash liquid.

It is seen from a comparison of the "% Salts Removed" lines of the graph of FIG. 2 that the interruption technique produces the required level of recovery while consuming far less wash water and consequently providing energy and material savings.

The term interrupted, as used herein, is intended to mean the substantial termination of the flow of the wash fluid. It should be understood that a minor flow of wash fluid would not significantly affect the operation, provided the minor flow is sufficiently small so that wash fluid is not wasted in accordance with the teachings of this invention.

In the prior art, upon occassion, a transient effect can cause an erroneous shut down. In the present system a one minute long second reading is taken ten minutes after the interruption signal, thus providing a safety check and preventing premature termination of the wash cycle due to an erroneous first signal.

It is also noted that it is possible to wash the cake at very low flow rate thereby maximizing the effectiveness of the wash flow, minimizing the quantity of required wash fliud, but maximizing the wash time period. The instant process achieves the desired result at maximum flow rates thus achieving minimum wash fluid consumption, maximum recovery of soluble, maximum flow rate and optimum wash times.

What is claimed is:

1. In the method of washing a filter cake to remove soluble constituents from the cake, the improvement comprising the steps of:

a. passing a wash fluid through a filter cake;

b. monitoring the concentration of at least one soluble constituent in the wash fluid;

c. interrupting the flow of wash fluid for a first predetermined period of time when the monitored concentration of said soluble constituents in the wash fluid reaches a predetermined first minimum level;

d. maintaining the flow of wash fluid in a non-flow state for a predetermined first period of time;

e. after the expiration of said first period of time, resuming the flow of wash fluid for a predetermined second minimum period of time;

f. terminating the washing operation if the monitored concentration of said soluble constituent in the wash fluid does not exceed a predetermined second minimum level at said predetermined second minimum period of time; and g. repeating steps (a) through (e) until the conditions of step (f) are met and the washing is terminated.

2. The method of claim 1, wherein said first minimum level and said second minimum level are identical.

3. The method of claim 1, wherein said first predetermined period of time is on the order of one minute.

4. The method of claim 1, wherein said second predetermined period of time is on the order of ten minutes.

5. The method of claim 1, wherein said predetermined first period of time is sufficient to permit the increase in the concentration of said soluble constituent in said wash fluid due to the non-flow state of said wash fluid.

6. An apparatus for controlling a washing process, comprising:

a. a filter;

b. first conduit means for delivering a first fluid mother liquor for flowing through said filter;

c. second conduit means for removing said first fluid mother liquor from said filter;

d. third conduit means for delivering a wash fluid to said filter for flow through said filter;

e. fourth conduit means for removing said wash fluid from said filter;

f. first valve means in said first conduit means;

g. second valve means in said third conduit means;

h. sensor means for sensing the concentration of a constituents of the fluid in said third conduit means;

i. a first timer;

j. a second timer;

k. first relay means responsive to a predetermined concentration level of said constituent of said fluid in said fourth conduit means, said first relay means being responsive to concentration levels below said predetermined concentration level to start said first timer, first timer responsive means coupled to said second valve means responsive to said first timer to cause said first valve means to be maintained in a mandatory closed condition;

second timer responsive means coupled to said second valve means responsive to said second timer to cause said second valve means to be maintained in a mandatory open condition.

7. The apparatus of claim 6, further comprising a third timer responsive to the start of the washing process, and a third timer responsive means, responsive to said third timer to cause said second valve means to be maintained in a mandatory open condition.

8. The apparatus of claim 7, wherein said sensor means is a conductivity cell.

* * * * *